United States Patent [19]

Tessler

[11] 3,880,832

[45] Apr. 29, 1975

[54] STARCH ETHER DERIVATIVES AND PREPARATION THEREOF

[75] Inventor: Martin M. Tessler, Edison, N.J.

[73] Assignee: National Starch and Chemical Corporation, New York, N.Y.

[22] Filed: Mar. 21, 1974

[21] Appl. No.: 453,320

[52] U.S. Cl. ............... 260/233.3 R; 260/112.5 R; 260/233.3 A; 260/233.5; 260/518 R; 260/518 A; 260/534 C; 260/534 S
[51] Int. Cl............................................ C08b 19/04
[58] Field of Search... 260/233.3 A, 233.3 R, 233.5, 260/534 C, 534 S, 112.5 R, 518 A, 518 R

[56] References Cited

UNITED STATES PATENTS

| | | | |
|---|---|---|---|
| 3,033,852 | 5/1962 | Paschall | 260/233.3 R |
| 3,477,904 | 11/1969 | Mehltretter | 260/233.3 R |

Primary Examiner—Melvyn I. Marquis

[57] ABSTRACT

Aqueous slurries or dispersions of starch are reacted with N-haloacetyl derivatives of selected amines, amino acids or peptides to yield starch ether derivatives. The starch ether derivatives of this invention are useful in a number of applications including use in paper sizes, coatings and adhesives.

6 Claims, No Drawings

STARCH ETHER DERIVATIVES AND PREPARATION THEREOF

This invention relates to a novel method for the preparation of starch ethers and to the modified starches obtained thereby.

The modification of starch by chemical derivatization is well known. An excellent review of the preparation of starch ethers up to 1968 may be found in Chapter 12 of "Starch and its Derivatives," by J. A. Radley (1968) Fourth Edition, published by Chapman and Hall, Ltd., London. None of the prior art, however, discloses or suggests the reaction of starch with N-haloacetyl derivatives of selected amines, amino acids and peptides in the presence of water.

It is the prime object of this invention to provide a new method for the preparation of starch ethers in aqueous systems. Another object of this invention is to provide a convenient and economical new method for chemically altering the paste properties of starch by a reaction which proceeds with granular starch in a water slurry. Other objects of the invention will be apparent from the following description.

According to the method of this invention, starch or a starch derivative is reacted in an aqueous medium with a N-haloacetyl derivative of a selected amine, amino acid, or peptide. The reaction is carried out under alkaline conditions for periods of 1 to 24 hours.

The applicable starch base materials which may be used in preparing the starch ether derivatives of this invention may be derived from any plant source including corn, potato, sweet potato, wheat, rice, sago, tapioca, waxy maize, sorghum, high amylose corn, or the like. Also included are the conversion products derived from any of the latter bases including for example, dextrines prepared by the hydrolytic action of acid and/or heat; oxidized starches prepared by treatment with oxidants such as sodium hypochlorite; fluidity or thin boiling starches prepared by enzyme conversion or by mild acid hydrolysis; and derivatized starches such as starch ethers and esters. The use of the term "starch base" is thus seen to include any amylaceous substance, whether untreated or chemically modified which, however, still retains free hydroxyl groups capable of entering into the etherification reaction of this invention. If the desired product is to be granular starch then obviously the initial starting material must be in granular form. It is to be noted that the method of this invention may also be carried out employing gelatinized starches which will result in the production of non-granular, starch ethers.

The N-haloacetyl derivatives of amines, amino acids, and peptides useful in preparing the starch ethers of this invention correspond to the following general formula:

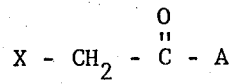

wherein A represents

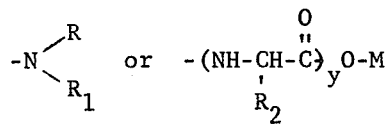

and

X is chlorine, bromine or iodine;

m is hydrogen or other cation such, for example, as sodium, potassium, lithium, ammonium, quaternary amine, and the like;

R, $R_1$ and $R_2$ are radicals selected from the group consisting of alkyl, substituted alkyl, cycloalkyl, substituted cycloalkyl, alkenyl, substituted alkenyl, phenyl, substituted phenyl, and hydrogen; and y is an integer of from 1 to 3.

In the above general formula, R and $R_1$ cannot both be hydrogen and the total number of carbon atoms in R and $R_1$ is less than 7. It is noted that various substituent groups may be present on the alkyl, cycloalkyl, alkenyl and phenyl radicals represented by R, $R_1$ and $R_2$ and examples of such substituent groups include chloro-, bromo-, iodo-, fluoro-, hydroxy-, carboxyl, nitro-, nitrile, imidazole, acetal, amine, alkyl ether, alkyl thioether, etc. In instances where y is greater than 1, the $R_2$ substitution need not be the same for each of the moieties encompassed by one y unit.

The preparation of various N-chloroacetyl amines, amino acids and peptides (polyamino acids) is well described in the literature. For example, the preparation of N-chloroacetyl amino acids is described by E. Ronwin, J. Org. Chem. 18, 127 (1953), and the preparation of N-chloroacetyl diethylamine is described by M. Neeman, J. Chem. Soc. 2525, (1955).

A typical preparation of a starch ether in accordance with the method of this invention is carried out by admixing selected n-haloacetyl amine, amino acid, or peptide with a starch base which is suspended or dispersed in water. An iodide salt, preferably an alkali metal iodide, can be added if desired (ordinarily in a concentration of 0.5 to 5%, based on the weight of starch) and serves to enhance the reaction efficiency of N-chloroacetyl and N-bromoacetyl derivatives with starch. The pH of the reaction mixture is ordinarily controlled so as to be between 9.5 – 13.0, with the preferred range being from 11.0 – 12.0. The ph is conveniently controlled by the periodic addition of a dilute aqueous solution of sodium hydroxide, but other common bases, such as potassium hydroxide, sodium carbonate, tetramethylammonium hydroxide, etc., may also be used. Sodium sulfate is ordinarily added to suppress swelling of the starch granule and yield a more filterable starch product. The reaction with non-granular starches is carried out at temperatures ranging from about 30 – 90°C. With granular starches lower temperatures are required, from about 30°– 60°C, since it will be recognized by the practitioner that use of temperatures above about 60°C with granular starches will result in granule swelling and filtration difficulties or gelatinization of the starch. Both with non-granular and granular starches, the preferred temperature range is from about 40° – 52°C.

In one variation of the described method, the pH of the reaction mixture is not controlled during the reaction. In this variation, an excess of base is added to the system which results in a pH in the range of 11.0 – 12.5, with the N-haloacetyl reagent being added and the reaction thereafter carried out as described before.

The amount of N-haloacetyl reagent added to the reaction mixture may vary from about 0.5 to 100 per cent, based on the dry weight of the starch, depending on such factors as the starch base employed, the degree of stabilization desired in the end product, the reactivity of the particular N-haloacetyl reagent employed, and the like. Reaction time will vary from about 1 hour to 24 hours depending on such factors as the reactivity of the reagent used, the amount of reagent used, the temperature employed, etc. After completion of reaction, the pH of the reaction mixture is preferably adjusted to a pH of from about 5.0 to 7.0 with any common acid such as hydrochloric acid, sulfuric acid, acetic acid, or the like. The resultant granular starch product is then recovered by filtration, washed free of residual salts with water, and dried. Optionally the washed product may be drum dried or spray dried, or gelatinized and isolated by freeze drying or alcohol precipitation. If the starch product is non-granular, it can be purified by dialysis according to conventional procedures to remove residual salts and thereafter be isolated by alcohol precipitation or freeze drying.

It is to be noted that a large number of variations may be effected in reacting the starch base with the specified reagents in accordance with the procedure described above without materially departing from the spirit of the invention. Such variations will be evident to the practitioner skilled in the art.

The starch ether derivatives of this invention are obtained by reactions which may be represented as follows:

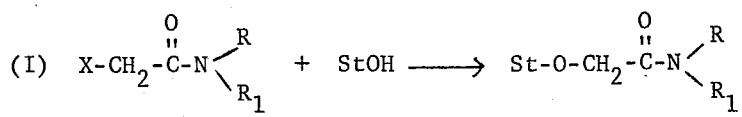

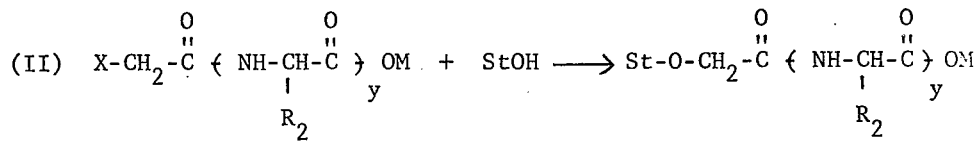

wherein StOH represents the starch molecule and X, R, $R_1$, $R_2$, M, and y are as defined hereinabove. These equations schematically indicate the chemical changes occurring during the reaction. The practitioner will recognize that the starch molecule is a polymer of glucose and contains three free hydroxyl groups per anhydroglucose unit in the polymer. (The non-reducing terminal glucose units contain four free hydroxyl groups.) Each of these hydroxyl groups can react as described in these equations. It is also known that the relative reactivity of each of the hydroxyl groups is not equivalent, some being more reactive than others, and that many hydroxyl groups from the same starch molecule will react to give the products of this invention.

Although mono- and di-N-substituted amides are substantially stable under the reaction conditions of this invention, some hydrolysis may occur to yield small amounts of carboxymethyl ether substituents bound to starch. The amount of carboxymethyl ether substituents formed will depend on such factors as the reagent used, the reaction temperature and the reaction time employed, etc.

The starch ether products prepared by the process of this invention are characterized by the stability of their dispersions. In other words, the cooked pastes derived from corn starch ether products display improved clarity and resistance to gelling on cooling. This highly desired property permits the derivatives of this invention to be utilized as, for example, in various sizings, coatings, thickening and adhesive applications.

In the following examples, which further illustrate the practice of this invention, all parts given are by weight unless otherwise noted.

EXAMPLE I

This example illustrates the use of various N-chloroacetyl amines, amino acids, and peptides in preparing the novel starch ethers of this invention wherein the resulting derivatives display an intact granule structure.

In preparing these derivatives designated Nos. 1 – 32 in Table I, the basic procedure which was followed comprised the suspension of the indicated starch base in 1.25 to 1.50 parts of water per part of starch. Prior to the addition of the starch base, 0.03 parts sodium hydroxide and 0.30 parts sodium sulfate per part of starch were dissolved in the water. Then the indicated amounts of potassium iodide followed by N-chloroacetyl reagent (both noted in Table I in "%, by weight, based on starch") were introduced and the reaction proceeded under agitation at the desired temperatures for the required period. The resulting starch ether derivatives were then acidified either with dilute hydrochloric or sulfuric acid, to a pH of 6.0, recovered by filtration and subsequently washed with water to remove residual salts.

The following Table I presents the pertinent data relating to the various starch derivatives which were prepared. The reagent in each instance is the N-chloroacetyl derivative of the indicated compound under the heading "Reagent." All of the derivatives were water dispersible and dispersions prepared with these starches exhibited improved stability in comparison with dispersions prepared using their corresponding underivatized bases. The nitrogen content of each starch derivative was measured by the Kjeldahl method.

Table 1

| Derivative Number | Reagent | Starch Base | % KI on Starch | % Reagent on Starch | Temp. °C. | Time Hours | % N₂ in Starch Ether Derivative |
|---|---|---|---|---|---|---|---|
| 1 | DL-alanine | corn | 0 | 10.0 | 51 | 6 | 0.20 |
| 2 | DL-alanine | corn | 0 | 10.0 | 51 | 16 | 0.27 |
| 3 | DL-alanine | corn | 0 | 10.0 | 51 | 24 | 0.26 |
| 4 | DL-alanine | corn | 0 | 10.0 | 41 | 16 | 0.15 |
| 5 | DL-alanine | corn | 5 | 10.0 | 51 | 6 | 0.32 |
| 6 | DL-alanine | corn | 5 | 10.0 | 51 | 17 | 0.35 |
| 7 | DL-alanine | corn | 15 | 10.0 | 51 | 17 | 0.34 |
| 8 | glycylglycine | corn | 0 | 10.0 | 51 | 6 | 0.18 |
| 9 | glycylglycine | corn | 0 | 10.0 | 51 | 16 | 0.30 |
| 10 | DL-phenylalanine | corn | 0 | 14.5 | 51 | 16 | 0.41 |
| 11 | L-tyrosine | corn | 0 | 16.0 | 51 | 16 | 0.27 |
| 12 | DL-valine | corn | 0 | 11.5 | 51 | 16 | 0.40 |
| 13 | DL-alanine | (a) | 0 | 10.0 | 50 | 16 | 0.18 |
| 14 | DL-alanine | (b) | 0 | 10.0 | 50 | 16 | 0.21 |
| 15 | DL-alanine | potato | 0 | 10.0 | 50 | 16 | 0.23 |
| 16 | DL-alanine | tapioca | 0 | 10.0 | 50 | 16 | 0.20 |
| 17 | DL-methionine | potato | 0 | 8.8 | 50 | 16 | 0.11 |
| 18 | DL-alanine | corn | 5 | 10.0 | 46 | 6 | 0.28 |
| 19 | DL-alanine | corn | 5 | 10.0 | 30 | 6 | 0.12 |
| 20 | DL-alanine | (c) | 0 | 10.0 | 51 | 16 | 0.21 |
| 21 | DL-alanine | (d) | 0 | 10.0 | 51 | 16 | 0.22 |
| 22 | diethylamine | corn | 0 | 10.0 | 50 | 16 | 0.56 |
| 23 | diethylamine | corn | 0 | 10.0 | 46 | 6 | 0.39 |
| 24 | diethylamine | corn | 5 | 10.0 | 46 | 6 | 0.64 |
| 25 | diallylamine | corn | 0 | 10.0 | 50 | 16 | 0.26 |
| 26 | dicyanomethylamine | corn | 0 | 10.0 | 50 | 16 | 0.38 |
| 27 | aminoacetaldehyde diemthylacetal | corn | 5 | 7.5 | 40 | 6 | 0.32 |
| 28 | aminoacetaldehyde dimethylacetal | corn | 0 | 7.5 | 40 | 6 | 0.20 |
| 29 | t-butylamine | corn | 0 | 10.0 | 45 | 16 | 0.19 |
| 30 | 2-aminoethanol | corn | 0 | 10.0 | 40 | 16 | 0.20 |
| 31 | methylaminoacetaldehyde dimethylacetal | corn | 0 | 10.0 | 45 | 16 | 0.21 |
| 32 | diethylamine | corn | 0 | 2.0 | 46 | 16 | 0.10 |

(a) Starch base was a thin boiling corn starch prepared by hypochlorite oxidation of corn starch to a degree known in the trade as 50 fluidity.
(b) Starch base was waxy maize which had been treated with 7.5% propylene oxide and 0.0225% phosphorus oxychloride.
(c) Starch base was thin boiling corn starch prepared by acid hydrolysis of corn starch to a degree known in the trade as 75 fluidity.
(d) Starch base was thin boiling waxy maize prepared by acid hydrolysis of waxy maize starch to a degree known in the trade as 85 fluidity.

EXAMPLE II

This example illustrates the preparation of a novel starch ether of this invention wheein the pH of the reaction medium is controlled during the reaction.

A total of 6 parts sodium sulfate and 1 part potassium iodide were dissolved in 25 parts water. Thereafter 20 parts of corn starch was added and the resulting suspension agitated at 50°C while the pH was increased to 10.0 by the addition of 3% aqueous sodium hydroxide. A solution of the sodium salt of N-chloroacetyl-DL-alanine was prepared by suspending 2.0 parts N-chloroacetyl-DL-alanine in 5.0 parts water and then adding 50% aqueous sodium hydroxide until all the N-chloroacetyl-DL-alanine was in solution and the pH was 9.0. The reagent solution was added to the starch slurry. The alkalinity of the slurry was maintained at ph 10.0 by the periodic addition of 3% aqueous sodium hydroxide while the slurry was agitated at 50°C for 6 hours. The pH was then lowered to 6.5 with 6N sulfuric acid, the starch recovered by filtration, washed three times with water and once with ethanol, and dried. The resulting starch ether derivative contained 0.18% nitrogen by weight.

EXAMPLE III

This example illustrates the use of N-chloroacetyl peptones in preparing the novel starch ethers of this invention. A total of 5 parts peptone C (a partially degraded polyamide derived from casein) was dissolved in 15 parts distilled water and the pH adjusted to 11.0 with 9.1% aqueous sodium hydroxide. The solution was cooled to 5°C and 1.25 parts chloroacetyl chloride added slowly while the temperature was maintained at about 5°C by cooling and the pH was maintained at 11.0 by the periodic addition of 9.1% aqueous sodium hydroxide. The solution was stirred until the pH became constant (stable) and the pH was then lowered to 7.0 with dilute hydrochloric acid.

A total of 20 parts corn starch was added to a solution of 6 parts sodium sulfate, 0.5 parts potassium iodide, and 0.6 parts sodium hydroxide in 25 parts water. To the resulting starch slurry was added the solution of N-chloroacetyl peptone C, as prepared above, and the mixture was heated at 52°C with agitation for 6 hours. The reaction mixture ws thereafter cooled at room temperature, and the pH was lowered to 6.0 with 10% aqueous hydrochloric acid. The starch product recovered by filtration, washed three times with water and dried. The dried starch ether contained 0.25% nitrogen, by weight.

EXAMPLE IV

This example illustrates the use of N-bromoacetyl diethylamine in preparing the novel starch ether derivatives of this invention.

A total of 15 parts corn starch was added to a solution of 0.45 parts sodium hydroxide, 4.5 parts sodium sulfate and 0.5 parts potassium iodide in 19 parts water. To the resultant starch slurry was added 1.5 parts of N-bromoacetyl diethylamine and the reaction mixture heated at 50°C with agitation for a period of 6 hours. The pH was then lowered from 11.4 to 6.0 by the addition of 10% aqueous hydrochloric acid. The starch derivative was recovered by filtration, washed with water and ethanol, and dried. The resulting starch ether contained 0.27% nitrogen by weight.

EXAMPLE V

This example illustrates two preparations at two temperatures of non-granular, starch ether derivatives using a previously gelatinized starch base.

A. A slurry of 20 parts corn starch and 250 parts water was heated on a steam bath until the starch gelatinized and the resulting dispersion was then cooled to about 50°C. The 1.1 part sodium hydroxide and 3.0 parts N-chloroacetyl-DL-alanine was added and the dispersion agitated at 51°C for 16 hours. The mixture was cooled to room temperature, the pH lowered to 5.5 with dilute sulfuric acid, the starch product purified by dialysis, concentrated, and isolated by freeze drying. The starch ether product contains 0.19% nitrogen, by weight.

B. A slurry of 200 parts acid hydrolyzed waxy maize starch (85 fluidity) and 800 parts water was heated on a steam bath until the starch gelatinized and the resulting dispersion was then cooled to about 80°C. The pH of the dispersion was raised to pH 12.0 by adding 3% aqueous sodium hydroxide, and 20 parts of N-chloroacetyl diethylamine was added thereto. The reaction medium was then agitated at 80°C for 1 hour while maintaining it at a pH of 12.0 by periodically adding 3% aqueous sodium hydroxide. The pH was thereafter lowered to 6.0 by adding 10% aqueous hydrochloric acid and the dispersion was cooled to room temperature. The starch product was purified by dialysis, isolated by freeze drying, washed twice with ethyl alcohol, once with acetone, and dried. The starch ether derivative contained 0.31% nitrogen, by weight.

Summarizing, it is seen that this invention provides a novel method for the preparation of new starch ether derivatives. Variations may be made in proportions procedures and materials without departing from the scope of this invention which is defined by the following claims.

What is claimed is:

1. A method for the preparation of starch ethers comprising:
    a. reacting, at a temperature of 30° to 90°C., a starch base with compound corresponding to the formula

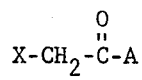

wherein A represents

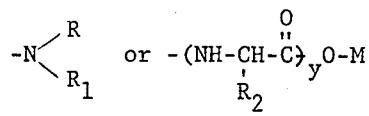

and

X is chlorine, bromine or iodine,

M is a cation;

R, $R_1$, and $R_2$ are radicals selected from the group consisting of alkyl, substituted alkyl, cycloalkyl, substituted cycloalkyl, alkenyl, substituted alkenyl, phenyl, substituted phenyl, and hydrogen, and R and $R_1$ cannot both be hydrogen and the total number of carbon atoms in R and $R_1$ is less than 7; and y is an integer of from 1 to 3; said reaction being conducted in an aqueous medium at a pH level of from about 9.5 to 13.0; and thereupon b. isolating the resultant starch ether derivative.

2. The method of claim 1 wherein said reaction is conducted at a temperature of from about 42° to 52°C. and for a period of from 1 to 24 hours.

3. The method of claim 1 wherein said starch base is a granular starch.

4. The method of claim 1 wherein said starch base is a gelatinized starch.

5. The method of claim 1 wherein the reagent is the N-haloacetyl derivative of a compound selected from the group consisting of DL-alanine, DL-phenylalanine, DL-methionine, L-tyrosine, glycylglycine, diethylamine, diallylamine, dicyanomethylamine, t-butylamine, 2-amino-ethanol, aminoacetaldehyde dimethyl acetal, and methylaminoacetaldehyde dimethylacetal.

6. As a composition of matter, a starch ether derivative prepared by the method of claim 1.

* * * * *